United States Patent [19]

Kaji et al.

[11] Patent Number: 5,907,821
[45] Date of Patent: May 25, 1999

[54] METHOD OF COMPUTER-BASED AUTOMATIC EXTRACTION OF TRANSLATION PAIRS OF WORDS FROM A BILINGUAL TEXT

[75] Inventors: Hiroyuki Kaji, Tama; Toshiko Aizono, Kawasaki, both of Japan

[73] Assignee: Hitachi, Ltd., Tokyo, Japan

[21] Appl. No.: 08/743,529

[22] Filed: Nov. 4, 1996

[30] Foreign Application Priority Data

Nov. 6, 1995 [JP] Japan .................................... 7-287135

[51] Int. Cl.⁶ ..................................................... G06F 17/28
[52] U.S. Cl. ........................ 704/4; 704/5; 704/7; 704/10; 707/532; 707/536
[58] Field of Search ................................. 704/1, 2, 4, 8, 704/10, 5, 7; 707/532, 535, 536

[56] References Cited

U.S. PATENT DOCUMENTS

| 5,406,480 | 4/1995 | Kanno ........................................ 704/10 |
| 5,510,981 | 4/1996 | Berger et al. ............................... 704/2 |
| 5,608,623 | 3/1997 | Sata et al. ................................... 704/4 |
| 5,652,898 | 7/1997 | Kaji ........................................... 704/10 |
| 5,675,819 | 10/1997 | Schuetze .................................. 704/10 |

FOREIGN PATENT DOCUMENTS

| 58-40684 | 3/1983 | Japan . |
| 61-040671 | 2/1986 | Japan . |
| 404264971 | 9/1992 | Japan . |
| 7-28819 | 1/1995 | Japan . |

OTHER PUBLICATIONS

Dialog File 35, Acc. No. 01592373: Fung, Using Word Signature Features For Terminology Translation From Large Corpra (Pattern Recognition), Columbia University, vol. 58/04–B of Dissertation Abstracts International, p. 1973. Abstract Only, 1997.

"A Program for Aligning Sentences in Bilingual Corpora," Computational Linguistics, vol. 19, No. 1, pp. 75–102 (Mar. 19, 1993).

"Extraction of Technical Term Bilingual Dictionary from Bilingual Corpus", by Y. Yamamoto and M. Sakamoto, Pub. Mar. 19, 1993. pp. 85–93. (abstract only in English).

*Primary Examiner*—David R. Hudspeth
*Assistant Examiner*—Matthew Lestina
*Attorney, Agent, or Firm*—Antonelli, Terry, Stout & Kraus, LLP

[57] ABSTRACT

For each word occurring in Japanese text, a set of words co-occurring with it and their co-occurrence frequencies are extracted, where two words are regarded as co-occurring with each other when they occur in the same sentence. Likewise, for each word occurring in an English text that corresponds to the Japanese text, a set of words co-occurring with it and their co-occurrence frequencies are extracted. A correlation is calculated between a Japanese word and an English word based upon the co-occurrent word set of the Japanese word and that of the English word, with the assistance of a Japanese-English bilingual dictionary of basic words. The correlation is defined as the ratio of the number of possible correspondences between the two co-occurrent word sets to the total of the co-occurrence frequencies in the two co-occurrent word sets. Pairs of words having a mutually maximum correlation are selected as candidate translation pairs of words, and displayed on a display device. Finally, user-selected pairs are registered in the bilingual dictionary. Thus, the bilingual dictionary is augmented incrementally.

39 Claims, 10 Drawing Sheets

FIG. 3A

24 JAPANESE TEXT

日本語テキストを読み込み、文に分割する。次に、各文を語に分割する。
NIHONGO TEKISUTO WO YOMIKOMI, BUN NI BUNKATU-SURU.
TUGI-NI, KAKU BUN WO GO NI BUNKATU-SURU.

FIG. 3B

RESULT OF ANALYSIS 261a

NIHONGO(1,3)\TEKISUTO(4,7)\NIHONGOTEKISUTO(1,7)\
YOMIKOMU(9,12)\BUN(14,14)\BUNKATUSURU(16,19)\\
BUN(25,25)\GO(27,27)\BUNKATUSURU(29,32)\\\

FIG. 3C

25 ENGLISH TEXT

A Japanese text is read and divided into sentences. Then, each sentence is divided into words.

FIG. 3D

RESULT OF ANALYSIS 261b

Japanese(3,10)\text(12,15)\Japanese text(3,15)\read(20,23)\
divide(29,35)\sentence(42,50)\\sentence(65,72)\divide(77,83)\
word(90,94)\\\

262 JAPANESE WORD TABLE

263 ENGLISH WORD TABLE

FIG. 5A

JAPANESE CO-OCCURRENCE FREQUENCY MATRIX 264

|  | NIHONGO | TEKISUTO | NIHONGO TEKISUTO | YOMIKOMU | BUN | BUNKATU SURU | GO |
|---|---|---|---|---|---|---|---|
| NIHONGO | 0 | 1 | 0 | 1 | 1 | 1 | 0 |
| TEKISUTO | 1 | 0 | 0 | 1 | 1 | 1 | 0 |
| NIHONGOTEKISUTO | 0 | 0 | 0 | 1 | 1 | 1 | 0 |
| YOMIKOMU | 1 | 1 | 1 | 0 | 1 | 1 | 0 |
| BUN | 1 | 1 | 1 | 1 | 0 | 2 | 1 |
| BUNKATUSURU | 1 | 1 | 1 | 1 | 2 | 0 | 1 |
| GO | 0 | 0 | 0 | 0 | 1 | 1 | 0 |

FIG. 5B

ENGLISH CO-OCCURRENCE FREQUENCY MATRIX 265

|  | Japanese | text | Japanese text | read | divide | sentence | word |
|---|---|---|---|---|---|---|---|
| Japanese | 0 | 1 | 0 | 1 | 1 | 1 | 0 |
| text | 1 | 0 | 0 | 1 | 1 | 1 | 0 |
| Japanese text | 0 | 0 | 0 | 1 | 1 | 1 | 0 |
| read | 1 | 1 | 1 | 0 | 1 | 1 | 0 |
| divide | 1 | 1 | 1 | 1 | 0 | 2 | 1 |
| sentence | 1 | 1 | 1 | 1 | 2 | 0 | 1 |
| word | 0 | 0 | 0 | 0 | 1 | 1 | 0 |

23 BILINGUAL DICTIONARY

JAPANESE-ENGLISH WORD CORRELATION MATRIX 266

|  | Japanese | text | Japanese text | read | divide | sentence | word |
|---|---|---|---|---|---|---|---|
| NIHONGO | 1/3 | 1/3 | 2/5 | 1/8 | 2/9 | 1/10 | 1/5 |
| TEKISUTO | 1/3 | 1/3 | 2/5 | 1/8 | 2/9 | 1/10 | 1/5 |
| NIHONGOTEKISUTO | 2/5 | 2/5 | 1/2 | 1/7 | 1/4 | 1/9 | 1/4 |
| YOMIKOMU | 1/8 | 1/8 | 1/7 | 1/9 | 1/11 | 0 | 1/6 |
| BUN | 1/10 | 1/10 | 1/9 | 0 | 1/6 | 1/6 | 0 |
| BUNKATUSURU | 2/9 | 2/9 | 1/4 | 1/11 | 2/5 | 1/6 | 1/8 |
| GO | 1/5 | 1/5 | 1/4 | 1/6 | 1/8 | 0 | 1/3 |

FIG. 8

JAPANESE - ENGLISH TRANSLATION MATRIX 267

|  | Japanese | text | Japanese text | read | divide | sentence | word |
|---|---|---|---|---|---|---|---|
| NIHONGO | 0 | 0 | 0 | 0 | 0 | 0 | 0 |
| TEKISUTO | 0 | 0 | 0 | 0 | 0 | 0 | 0 |
| NIHONGOTEKISUTO | 0 | 0 | 0 | 0 | 0 | 0 | 0 |
| YOMIKOMU | 0 | 0 | 0 | 1 | 0 | 0 | 0 |
| BUN | 0 | 0 | 0 | 0 | 0 | 1 | 0 |
| BUNKATUSURU | 0 | 0 | 0 | 0 | 0 | 0 | 0 |
| GO | 0 | 0 | 0 | 0 | 0 | 0 | 1 |

FIG. 9

JAPANESE - ENGLISH VIRTUAL CO-OCCURRENCE FREQUENCY MATRIX 268

|  | Japanese | text | Japanese text | read | divide | sentence | word |
|---|---|---|---|---|---|---|---|
| NIHONGO | 0 | 0 | 0 | 1 | 0 | 1 | 0 |
| TEKISUTO | 0 | 0 | 0 | 1 | 0 | 1 | 0 |
| NIHONGOTEKISUTO | 0 | 0 | 0 | 1 | 0 | 1 | 0 |
| YOMIKOMU | 0 | 0 | 0 | 0 | 0 | 1 | 0 |
| BUN | 0 | 0 | 0 | 1 | 0 | 0 | 1 |
| BUNKATUSURU | 0 | 0 | 0 | 1 | 0 | 2 | 1 |
| GO | 0 | 0 | 0 | 0 | 0 | 1 | 0 |

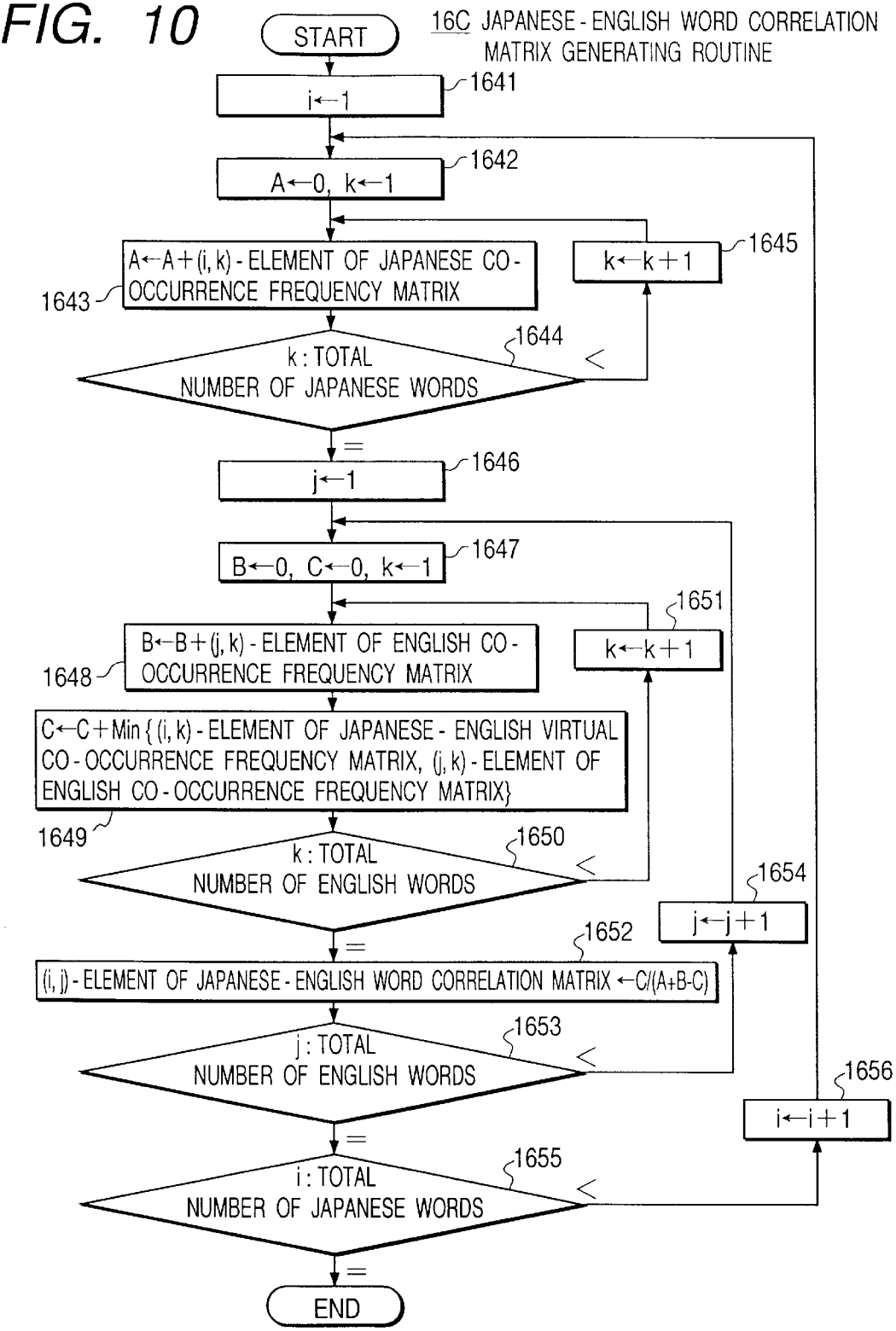

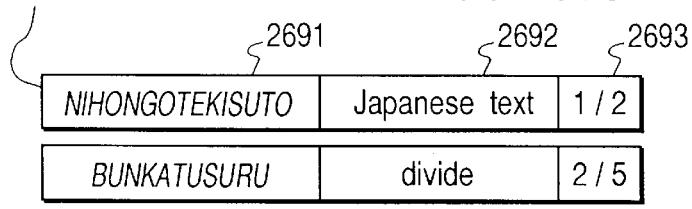
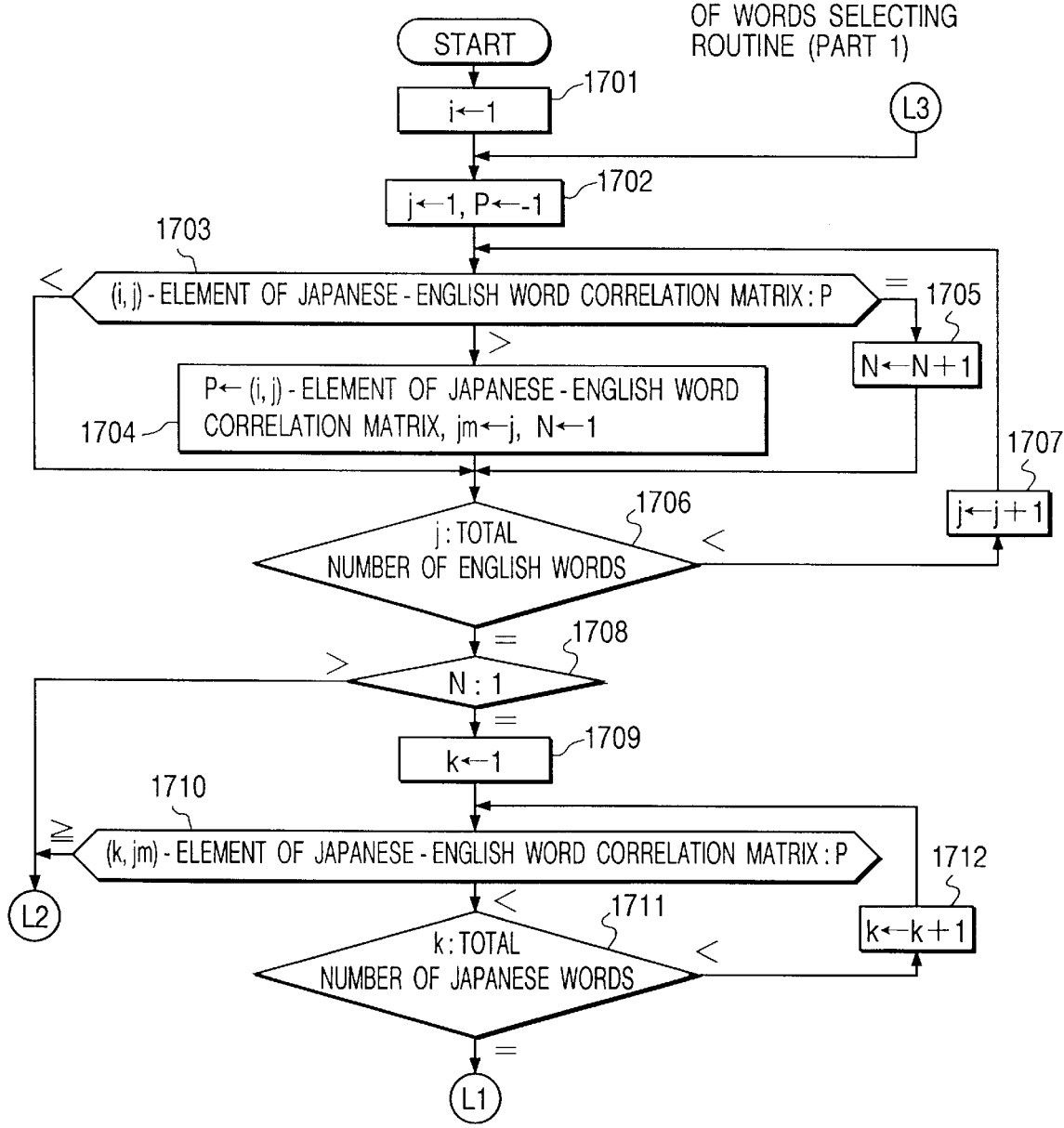

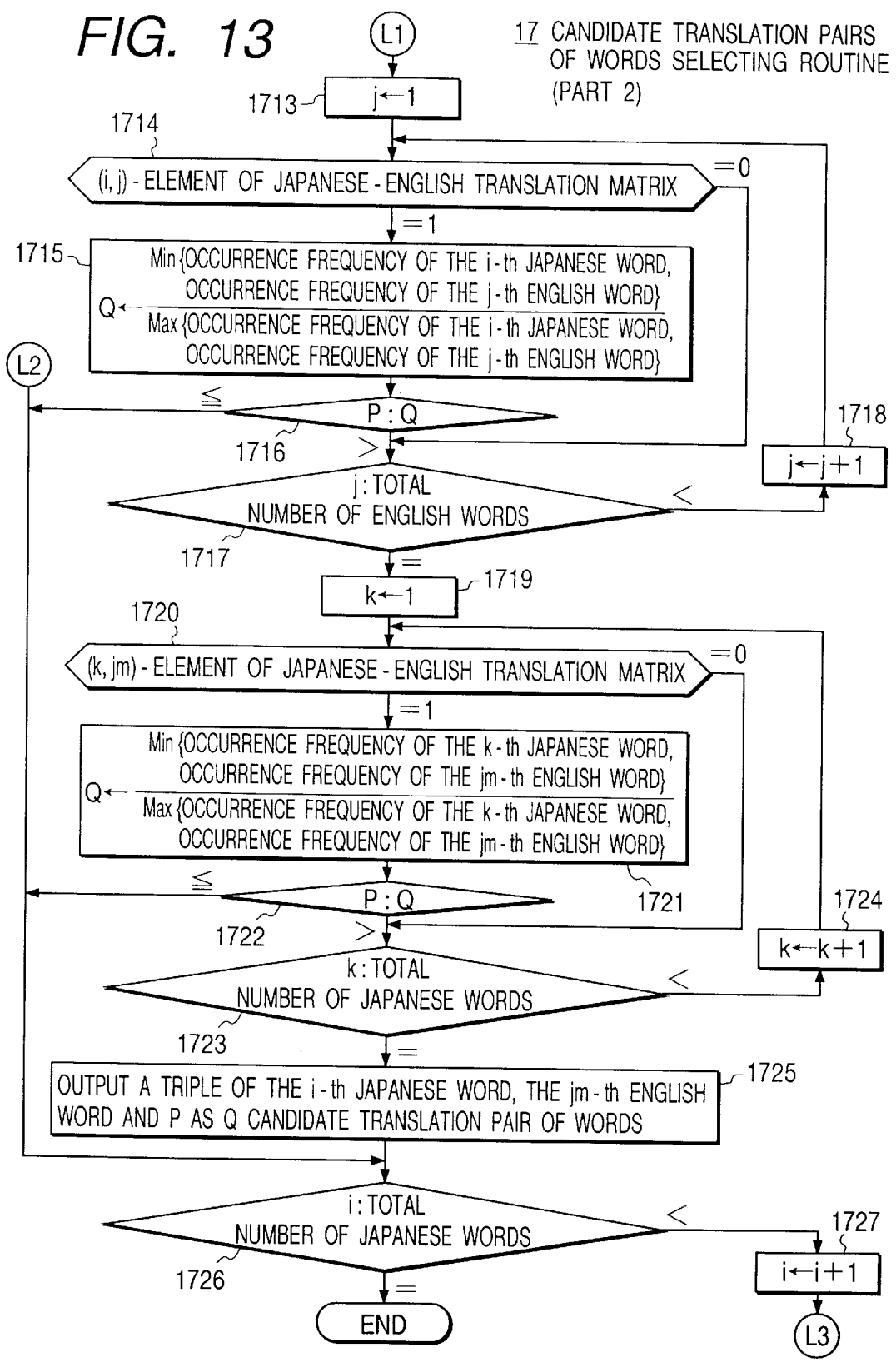

5,907,821

METHOD OF COMPUTER-BASED AUTOMATIC EXTRACTION OF TRANSLATION PAIRS OF WORDS FROM A BILINGUAL TEXT

BACKGROUND OF THE INVENTION

The present invention relates to a method for automatically extracting translation pairs of words to be registered in a bilingual dictionary which is used for a machine translation system or the like.

Machine translation systems necessitate a bilingual dictionary which contains pairs of a word in source language and its equivalent word in target language. Such a bilingual dictionary must have a sufficient word coverage in order to achieve high-quality translation.

Manufacturers of machine translation systems provide bilingual dictionaries of basic words in general, whereas system users need to create a bilingual dictionary of technical terms. It is expensive to create a technical term dictionary manually, and therefore a method for extracting translation pairs of words automatically from a bilingual pairs of texts is desired. A bilingual dictionary of technical terms is indispensable for not only a machine translation system but also a cross-language information retrieval system, and there is intense demand for automatic generation of a bilingual dictionary.

A method of automatic generation of a bilingual dictionary from a bilingual pair of texts is disclosed in Japanese patent publication JP-A-Hei-7-28819 (will be called "first prior art"), for example. This method uses a pair of a source language text and a target language text which are aligned sentence by sentence. It evaluates the frequency of each pair of a source language word and a target language word occurring together in pairs of aligned sentences. It also evaluates the occurrence frequency of each word in the source and target language texts. It calculates a correlation between each pair of a source language word and a target language word based on these frequencies, and selects pairs of words with high correlation as translation pairs of words.

Conventional methods including the one described in the above-mentioned patent publication JP-A-Hei-7-28819 require a bilingual pair of texts that are aligned sentence by sentence. However, a usually available bilingual pair of texts are not aligned sentence by sentence. They are merely translation of each other as a whole. On this account, the conventional methods oblige us to make the sentence-by-sentence alignment of a bilingual pair of texts prior to extracting translation pairs of words from the bilingual pair of texts. This task, if carried out by manpower, is very expensive.

In this situation, studies are under way with the intention of carrying out sentence-by-sentence alignment of a bilingual pair of texts by use of a computer, as described, for example, in an article entitled "A Program for Aligning Sentences in Bilingual Corpora", Computational Linguistics, Vol.19, No.1, pp.75–102 (March 1993) (will be called "second prior art"). However, it is still impossible to carry out the sentence-by-sentence alignment of a bilingual pair of texts automatically at perfect accuracy. Because one sentence in the source language text sometimes corresponds to two or more sentences in the target language text, and vice versa. A sentence in the source language text may not have a counterpart in the target language text, and vice versa. On this account, human check and correction are inevitable for the result of computer-based sentence-by-sentence alignment, and therefore the conventional technique for generating a bilingual dictionary, even if used with the above-mentioned second prior art, is still costly.

To cope with this matter, studies are under way with the intention of generating a bilingual dictionary from a bilingual pair of texts that are not aligned sentence by sentence, as described, for example, in an article entitled "Extraction of Technical Term Bilingual Dictionary from Bilingual Corpus", by Y.Yamamoto and M.Sakamoto, published in Japanese in Technical Report of Information Processing Society of Japan, NL-94-12 (March 1993) (will be called "third prior art"). Consulting a bilingual dictionary of simple words, this method extracts translation pairs of compound words, each made up of two or more simple words, from a pair of a source language text and a target language text. It selects a pair of a compound word of source language and a compound word of target language when the constituent words of the compound word of source language can be coupled with those of the compound word of target language through a bilingual dictionary of simple words.

SUMMARY OF THE INVENTION

The third prior art cannot extract a translation pair of simple words. It can extract a translation pair of compound words only in case one to one correspondence is observed between their constituents words and the bilingual dictionary contains all of the correspondences.

Therefore, it is an object of the present invention to automatically extract translation pairs of words from a bilingual text which comprises a text of the first language and a corresponding text of the second language which is not necessarily aligned sentence by sentence.

It is a more concrete object of the present invention to automatically extract both translation pairs of simple words and translation pairs of compound words.

In order to attain the above-mentioned objects, the present invention executes the following steps by a computer for automatic extraction of a translation pair of words which comprises a word of the first language and a word of the second language corresponding thereto.

A plurality of words of the first language occurring in the first text described in the first language are extracted, from first text data which represents said first text.

In correspondence to each occurrent word of the first language, a set of a plurality of co-occurrent words of the first language for said each occurring word of the first language are extracted. Each co-occurrent word of the first language is a word which occurs in a neighborhood of at least one of a plurality of positions within said first text where said each occurrent word of the first language occurs, and which fulfills at the same time a first predetermined condition related to said each occurrent word of the first language. Said extraction is done from said first text data.

A plurality of words of the second language occurring in the second text described in the second language and corresponding to said first text are extracted, based on second text data which represents said second text.

In correspondence to each occurrent word of the second language, a set of a plurality of co-occurrent words of the second language for said each occurrent word of the second language are extracted. Each co-occurrent word of the second language is a word which occurs in a neighborhood of at least one of a plurality of positions within said second text where said each occurrent word of the second language occurs, and which fulfills at the same time a second predetermined condition related to said each occurrent word of the second language and corresponding to said first predetermined condition. Said extraction is done from said second text data.

A correlation is calculated between each occurrent word of the first language and each occurrent word of the second language. Said calculation is done based on said set of a plurality of co-occurrent words of the first language extracted in correspondence to said each occurrent word of the first language and said set of a plurality of co-occurrent words of the second language extracted in correspondence to said each occurrent word of the second language.

At least one pair of words is selected as a translation pair of words from a plurality of pairs of one of said plurality of occurrent words of the first language and one of said plurality of occurrent words of the second language. The selected at least one pair of words is a pair of words between which a correlation which satisfies a predetermined condition related to a translation pair of words. Said selection is done based upon a plurality of correlations calculated for said plurality of pairs of words.

To be more concrete, a correlation between each occurrent word of the first language and each occurrent word of the second language is calculated, based upon co-occurrence frequencies of pairs of words coincident to predetermined translation pairs of words already registered in a bilingual dictionary, among total pairs of a word included in said set of co-occurrent words of the first language extracted in correspondence to said each occurrent word of the first language and a word included in said set of co-occurrent words of the second language extracted in correspondence to said each occurrent word of the second language.

The finding underlying the method of the present invention is as follows. In a bilingual pair of texts, a pair of words corresponding to each other generally accompany the same context, although expressed in the two different languages. If we calculate the pairwise correlations between the contexts in which the words occur, a corresponding pair of words will show a high correlation. Although one occurrence of a word may not give a sufficient context to characterize the word, accumulating all the contexts in which the word occurs throughout the text allows the word to be distinguished from the other words in the same language text.

We use the set of words co-occurring with word w, which we refer to as the co-occurrence word set of w, to concisely represent the accumulated contexts characterizing w. To associate two co-occurrent word sets whose elements are words in different languages, we consult a bilingual dictionary and extract the possible word correspondences between them. The point is that even if the pair of words to be associated is missing in the bilingual dictionary, their co-occurrent word sets can be associated through the bilingual dictionary. Of course, some of the word correspondences between the co-occurrent word sets may be also missing in the bilingual dictionary. Nevertheless, the co-occurrent word sets can be still associated owing to the other correspondences between them that are contained in the bilingual dictionary.

BRIEF DESCRIPTION OF THE DRAWINGS

FIG. 3A is a diagram showing an example of Japanese text;

FIG. 3B is a diagram showing an example of Japanese text analysis result;

FIG. 3C is a diagram showing an example of English text;

FIG. 3D is a diagram showing an example of English text analysis result;

FIG. 5A is a diagram showing an example of Japanese co-occurrence frequency matrix;

FIG. 5B is a diagram showing an example of English co-occurrence frequency matrix;

FIG. 8 is a diagram showing an example of Japanese-English translation matrix;

FIG. 9 is a diagram showing an example of Japanese-English virtual co-occurrence frequency matrix;

FIG. 10 is a flowchart of the Japanese-English word correlation matrix generating routine run in the system of FIG. 1;

FIG. 11 is a diagram showing an example of candidate translation pairs of words extracted by the system of FIG. 1;

FIG. 12 is a flowchart of a part of the candidate translation pairs of words selecting routine run in the system of FIG. 1; and FIG. 13 is a flowchart of another part of the candidate translation pairs of words selecting routine.

DESCRIPTION OF THE PREFERRED EMBODIMENT

Figure 1:
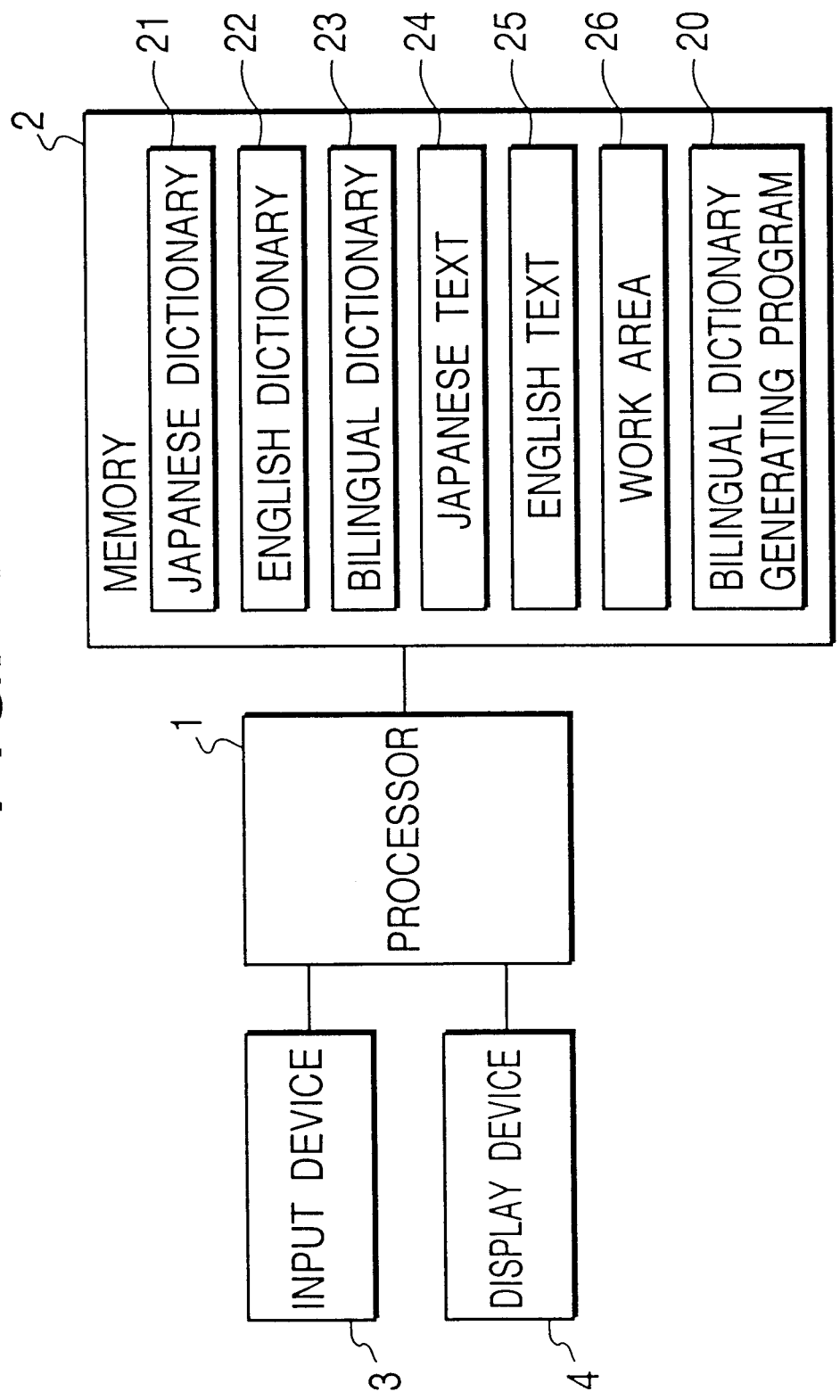
FIG. 1 is a schematic diagram of a Japanese-English bilingual dictionary generation system according to the present invention.

A method of automatic generation of a bilingual dictionary according to the present invention will be explained in detail with reference to an embodiment shown in the drawings.

FIG. 1 shows a Japanese-English bilingual dictionary generation system which extracts translation pairs of words from a Japanese-English bilingual text according to the present invention.

The system consists of a processor 1, a memory 2, an input device 3, and a display device 4. The memory 2 stores a bilingual dictionary generating program 20, a Japanese dictionary 21, an English dictionary 22, a bilingual dictionary 23, and a Japanese text 24 and an English text 25 which form a bilingual text. The bilingual dictionary 23 contains a plurality of records each of which includes a Japanese word 231 and a corresponding English word 232 as shown, for example, in FIG. 6, and can be retrieved by using a Japanese word as a key.

Basically, the bilingual dictionary generating program 20 extracts new translation pairs of words from the Japanese text 24 and the English text 25 with the assistance of the bilingual dictionary 23, and adds the extracted pairs of words to the bilingual dictionary 23.

The program 20 extracts pairs of words co-occurring within a prescribed window from the Japanese text 24 and counts the co-occurrence frequency of each pair. Similarly, it extracts pairs of words co-occurring within a prescribed window from the English text 25 and counts the co-occurrence frequency of each pair. Then, the program 20 calculates a correlation between a Japanese word and an English word based on the set of words co-occurring with the Japanese word and the set of words co-occurring with the English word. The bilingual dictionary 23 is looked up to relate the co-occurrent Japanese word set with the co-occurrent English word set. Then, the program 20 selects one or more pairs of words with high correlation, and displays the selected pair(s) of words as candidate translation pair(s) of words on the display device 4. Finally, the program 20 registers in the bilingual dictionary 23 the candidate translation pair(s) of words that a user determines to register.

Figure 2:
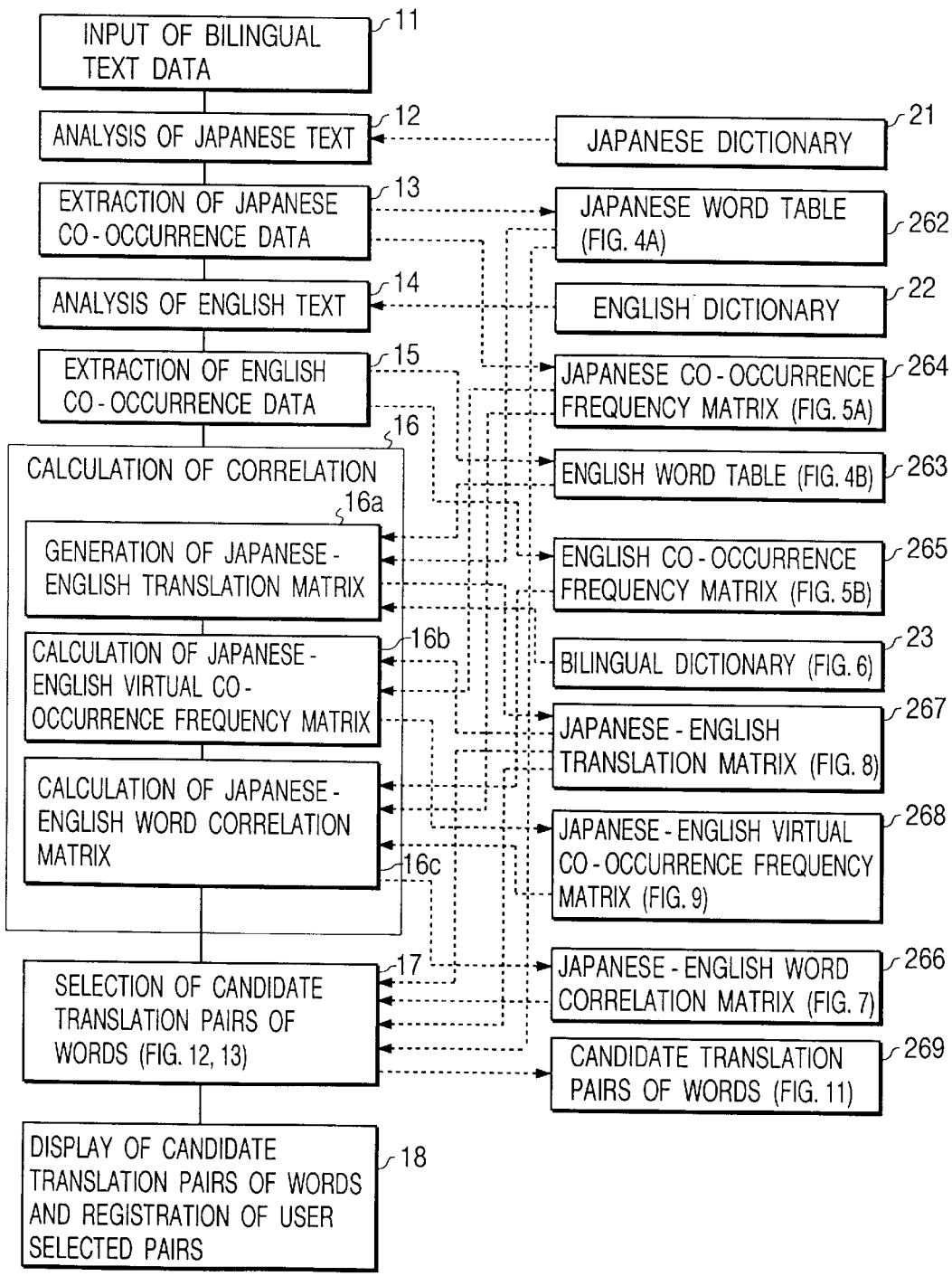
FIG. 2 is a flowchart of the bilingual dictionary generating program run in the system of FIG. 1.

The processing of the bilingual dictionary generating program 20 will be explained in more details with reference to FIG. 2.

(1) Input of bilingual text data (step 11)

The program 20 operates on the input device 3 to read-in the data representing a Japanese text 24 and the data representing an English text 25, and stores them in the memory 2. FIG. 3A shows an example of Japanese text 24. Although the Japanese text 24 is a character string including Kanji and Kana characters, transcription in Romaji (alphabetical expression) is appended below the original character string in FIG. 3A. In the following explanation, Japanese words are solely expressed in Romaji of italic type.

The input device 3 used in the system differs depending on the type of medium which records a bilingual text. For example, the input device 3 is a disk drive unit when the bilingual text is recorded on a magnetic disk, or it is a CD-ROM drive unit when the bilingual text is recorded on a CD-ROM. The input device 3 is a communication control unit when the bilingual text is received through a communication line, or it is a keyboard when the bilingual text is entered directly by a human operator.

(2) Analysis of Japanese text (step 12)

This step segments the Japanese text 24 into sentences, and further segments each sentence into words. It extracts not only simple words but also compound words.

Segmentation of the Japanese text 24 into sentences is based on the sequential verification of individual characters across the whole character string of the text. A string of characters which begins with a character next to a period or carriage return (CR) code and ends with the next period or CR code is defined to be a sentence. Another scheme of sentence segmentation may be employed. To segment a sentence into words, the program 20 carries out morphological analysis for the sentence by making reference to the Japanese dictionary 21. The morphological analysis used in this embodiment is disclosed in Japanese patent publication JP-A-Sho-61-40671 (will be called "fourth prior art"), which is incorporated herein by reference.

As a result of the morphological analysis, each sentence is expressed as a string of words. In this embodiment, a resulting word string is additionally processed to remove function words including particles and auxiliary verbs so that only content words such as nouns, verbs, adjectives and others are left in the word string. The reason is that function words involve intricate correspondence between languages, and therefore it is reasonable to deal with only content words which have relatively straightforward correspondence between languages.

Inflectional words such as verbs, which appear in various inflected forms in the Japanese text 24, are replaced with their basic forms (e.g., terminating forms). The basic forms are used in the bilingual dictionary 23.

Extraction of compound words is based on detection of predefined patterns of part of speech sequence. For example, a sequence of nouns is extracted as a compound noun.

The output of this step is a string of words with positional information of each word in the Japanese text as shown, for example, in FIG. 3B. In the analysis result 261a of Japanese text, symbol "\" indicates a boundary between words, symbol "\\" indicates a boundary between sentences, and symbol "\\\" indicates the end of text. A numeric data (m,n) following a word indicates the position of the word in the text, and specifically it indicates that the word begins with the m-th character and ends with the n-th character of the text. This positional information is used to check overlapping between words in the subsequent step 13 of extracting Japanese co-occurrence data.

(3) Extraction of Japanese co-occurrence data (step 13)

Figure 4A:
FIG. 4A is a diagram showing an example of Japanese word table.

This step initially produces a Japanese word table 262 based on the analysis result 261a of the Japanese text 24. The table 262 contains the distinct words 2621 occurring in the Japanese text 24 and their occurrence frequencies 2622 as shown in FIG. 4A. The figure shows the words and their occurrence frequencies derived from an example of analysis result 261a shown in FIG. 3B.

Subsequently, this step produces a Japanese co-occurrence frequency matrix 264. The matrix 264 has rows and columns arranged in correspondence to the words in the Japanese word table 262 as shown in FIG. 5A, and element (i,J) represents the frequency of the J-th word co-occurring with the i-th word.

The J-th word is regarded as co-occurring with the i-th word, when the J-th word occurs in the vicinity to a location where the i-th word occurs, and at the same time the j-th word meets a first predetermined condition associated with the i-th word. In this embodiment, this first condition is that the J-th word occurs within a predetermined range from the i-th word, typically within the same sentence as the i-th word. By counting the sentences including both the i-th and J-th words in the analysis result 261a of Japanese text, the element (i,j) of the Japanese co-occurrence frequency matrix 264 is evaluated.

A pair of a compound word and one of its constituent words, which occur within the same sentence by the nature of things, should be excluded from the co-occurrence data. Each pair of words in a sentence included in the Japanese sentence analysis result 261a is Judged to be a genuine co-occurrence or not based on the positional information of the two words.

FIG. 5A shows the co-occurrence frequency matrix produced from the analysis result 261a of FIG. 3B. For example, the value of matrix element corresponding to a pair of words "Bunkatsu-suru" and "Bun" is 2, which indicates that these words co-occur twice in the Japanese text 24 of FIG. 3A.

(4) Analysis of English text (step 14)

The same process as the preceding step 12 is carried out for the English text 25. Due to the difference of language, this step differs from step 12 as follows.

In English texts, periods that do not mean the full stop of sentences appear relatively frequently, typically for abbreviation such as "Mr.". Accordingly erroneous segmentation of a text into sentences is liable to arise when the exact same segmentation method as step 12 is applied. In order to prevent the error, a list of words accompanied by a period is prepared. In analyzing an English text, each character string including a period is collated with the words in the list, and the period is not judged to be a sentence delimiter if the character string coincides with any of the listed words. The morphological analysis method used in this embodiment is disclosed in Japanese patent publication JP-A-Sho-58-

40684 (will be called "fifth prior art"), which is incorporated herein by reference. In regard to extraction of compound words, a sequence of an adjective and succeeding nouns is extracted as a compound noun, in addition to a sequence of nouns.

FIG. 3C shows an example of English text 25, and FIG. 3D shows the analysis result of this text. Symbols "\", "\\", "\\\" and (m,n) in the analysis result 261b of English text have the same meaning as those in the analysis result 261a of Japanese text.

(5) Extraction of English co-occurrence data (step 15)

The same process as the preceding step 13 produces an English word table 263 (FIG. 4B) and an English co-occurrence frequency matrix 265 (FIG. 5B) from the analysis result 261b of English text. These table 263 and matrix 265 are similar to those 262 and 264 for the Japanese text 24 respectively, English co-occurrent words are defined similarly to Japanese co-occurrent words. That is, an English word EW2 is regarded as co-occurring with an English word EW1, when the word EW2 occurs in the vicinity to one of the locations where the word EW2 occurs, and at the same time the word EW2 meets a second predetermined condition associated with the word EW1. In this embodiment, this second condition is that the word EW2 occurs within a predetermined range (co-occurrence range) from the word EW1, typically within the same sentence as the word EW1. Although the second condition may be determined independently from that for Japanese co-occurrence words, it is preferable to adopt the same condition for Japanese and English co-occurrence words.

(6) Calculation of correlation (step 16)

This step produces a Japanese-English word correlation matrix 266 based on the Japanese word table 262, the English word table 263, the Japanese co-occurrence frequency matrix 264, the English co-occurrence frequency matrix 265, and the bilingual dictionary 23. The word correlation matrix 266 has rows and columns arranged in correspondence to the words in the Japanese word table 262 of FIG. 4A and the words in the English word table 263 of FIG. 4B, respectively. Element (i,j) represents the correlation between the i-th word in the Japanese word table 262 and j-th word in the English word table 263.

The correlation Cor(JW,EW) between Japanese word JW and English word EW is calculated from the co-occurrent word set of JW and that of EW. In this embodiment, it is defined as follows:

$$Cor(JW,EW)=C/(A+B-C),$$

where A is the number of elements of the co-occurrent word set of JW, B is the number of elements of the co-occurrent word set of EW, and C is the number of elements of the intersection of the co-occurrent word set of JW and that of EW.

The co-occurrent word set of JW is a set of words that co-occur with JW at any of the locations where JW occurs in the Japanese text 24. The elements of this set, which is different from the usual definition of set, are accompanied by their frequencies, and the number of elements of the set is defined as the total of the frequencies of its elements. For example, according to the Japanese co-occurrence frequency matrix 264 of FIG. 5A, the co-occurrent word set of word "Bunkatsusuru" is as follows:

{Nihongol/1, Tekisuto/1, Nihongo-Tekisuto/1, Yomikomu/1, Bun/2, Go/1}, where a numeric data next to symbol "/" indicates the co-occurrence frequency of the word that precedes the symbol "/".

Accordingly, the number of elements of the co-occurrent word set of the word "Bunkatsusuru" is evaluated to be 7.

Similarly, the co-occurrent word set of EW is a set of words that co-occur with EW at any of the locations where EW occurs in the English text 25. The number of elements of the set is defined as the total of the frequencies of its elements. For example, according to the English co-occurrence frequency matrix 265 of FIG. 5B, the co-occurrent word set of word "text" is as follows:

{Japanese/1, read/1, divide/1, sentence/1}.

Accordingly, the number of elements of the co-occurrent word set of the word "text" is evaluated to be 4.

Figures 6, 7:
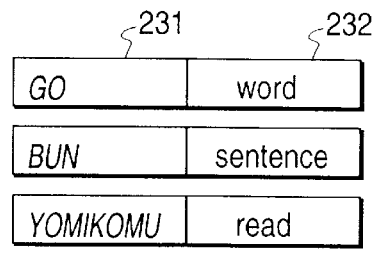
FIG. 6 is a diagram showing an example of bilingual dictionary used in the system of FIG. 1.
FIG. 7 is a diagram showing an example of Japanese-English word correlation matrix.

The intersection of a co-occurrent Japanese word set and a co-occurrent English word set, which is different from the usual definition of intersection, is a set of pairs of a Japanese word and an English word accompanied by their frequencies. The intersection of the co-occurrent word sets of JW and EW includes a pair of Japanese word JW' and English word EW', if and only if the co-occurrent word sets of JW includes JW', the co-occurrent word sets of EW includes EW', and the pair of JW' and EW' is already registered in the bilingual dictionary 23. The frequency of the pair of JW' and EW' is defined as the minimum of the co-occurrence frequency of JE' in the co-occurrent word set of JW and the co-occurrence frequency of EW' in the co-occurrent word set of EW. For example, in case the bilingual dictionary 23 contains only three word pairs as shown in FIG. 6, the intersection of the co-occurrent word set of Japanese word "Bunkatsusuru" and co-occurrent word set of English word "text" is:

{(Yomikomu, read)/1, (Bun, sentence)/1}.

Accordingly, the number of elements of this intersection is evaluated to be 2.

The following explains the basis of induction of the above-mentioned intersection of the co-occurrent word set of Japanese word "Bunkatsusuru" and the co-occurrent word set of English word "text".

Among pairs of a word included in the co-occurrent word set of "Bunkatsusuru" and a word included in the co-occurrent word set of "text", there are two pairs (Yomikomu, read) and (Bun, sentence) registered in the bilingual dictionary 23. The co-occurrence frequency of "Yomikomu" in the co-occurrent word set of "Bunkatsusuru" is 1, and the co-occurrence frequency of "read" in the co-occurrent word set of "text" is 1. Accordingly, the frequency of (Yomikomu, read) in the intersection is min{1,1}, i.e., it is 1. The co-occurrence frequency of "Bun" in the co-occurrent word set of "Bunkatsusuru" is 2, and the co-occurrence frequency of "sentence" in the co-occurrent word set of "text" is 1. Accordingly, the frequency of (Bun, sentence) in the intersection is min{2,1}, i.e., it is 1.

In consequence, Japanese word "Bunkatsusuru" and English word "text" have the following correlation;

Cor(Bunkatsusuru, text)=2/(7+4−2)=2/9.

It is obvious from the foregoing that Cor(JW,EW) indicates the proportion of the words co-occurring with JW or EW that can be coupled through the bilingual dictionary 23. In other words, the correlation Cor(JW,EW) indicates the similarity between the context surrounding JW and the context surrounding EW. Accordingly, it is reasonable to assume that the higher the correlation is, the stronger the possibility of JW and EW forming a translation pair of words is.

Thus, in the correlation calculating step 16, the program 20 calculates correlations between words occurring in the Japanese text 24 and words occurring in the English text 25, and produces a Japanese-English word correlation matrix 266. FIG. 7 shows an example of Japanese-English word correlation matrix 266, which is calculated from the Japanese co-occurrence frequency matrix 264 shown in FIG. 5A, the English co-occurrence frequency matrix 265 shown in FIG. 5B, and the bilingual dictionary 23 shown in FIG. 6.

The calculation of correlation in step 16 is specifically carried out in three sub-steps of generating a Japanese-English translation matrix, calculating a Japanese-English virtual co-occurrence frequency matrix, and calculating a Japanese-English word correlation matrix.

(6a) Generation of Japanese-English translation matrix (sub-step 16a)

This sub-step generates a Japanese-English translation matrix 267. This matrix has rows and columns arranged in correspondence to the words in the Japanese word table 262 and the words in the English word table 263, respectively. Element (i,j) takes a value "1" or "0" depending on whether or not the pair of the i-th word in the Japanese word table 262 and the J-th word in the English word table 263 is included in the bilingual dictionary 23. The translation matrix 267 can readily be generated from the Japanese word table 262, English word table 263, and bilingual dictionary 23. FIG. 8 shows an example of Japanese-English translation matrix 267, which is generated from the Japanese word table 262 shown in FIG. 4A, the English word table 263 shown in FIG. 4B, and the bilingual dictionary 23 shown in FIG. 6.

(6b) Calculation of Japanese-English virtual co-occurrence frequency matrix (sub-step 16b) This sub-step calculates a Japanese-English virtual co-occurrence frequency matrix 268 which is defined as the product of the Japanese co-occurrence frequency matrix 264 and Japanese-English translation matrix 267. The virtual co-occurrence frequency matrix 268 has rows and columns arranged in correspondence to the words in the Japanese word table 262 and the words in the English word table 263, respectively, as shown in FIG. 9. Element (i,j) represents the virtual co-occurrence frequency of the i-th word in the Japanese word table 262 and J-th word in the English word table 263. The virtual co-occurrence signifies that if Japanese word JW2 co-occurs with Japanese word JW1, then possible English translations of JW2 are treated as if they co-occurred with JW1. Calculating a Japanese-English virtual co-occurrence frequency matrix 268 is equivalent to converting a co-occurrent Japanese word set into a virtually co-occurrent English word set. Substitution of a virtually co-occurrent English word set for a co-occurrent Japanese word set makes it easy to calculate the number of elements of the intersection of a co-occurrent Japanese word set and a co-occurrent English word set.

FIG. 9 shows an example of the Japanese-English virtual co-occurrence frequency matrix 268, which is calculated from Japanese co-occurrence frequency matrix 264 of FIG. 5A and Japanese-English translation matrix 267 of FIG. 8.

(6c) Calculation of Japanese-English word correlation matrix (sub-step 16c)

This sub-step calculates a correlation between one of the words in the Japanese word table 262 and one of the words in the English word table 263 in accordance with the preceding definition of correlation. That is, the Japanese-English correlation matrix 266 is calculated from the Japanese co-occurrence frequency matrix 264, the English co-occurrence frequency matrix 265 and the Japanese-English virtual co-occurrence frequency matrix 268.

FIG. 10 shows the processing of this sub-step. In FIG. 10 and the following explanation, symbols A, B and C are the same as those in the preceding definition of correlation.

Initially, index i which points an element of the Japanese word table 262 is initialized to "1" (step 1641). The following process is repeated, while incrementing the index i by one (step 1656), until it reaches the number of Japanese words (step 1655).

Variable A for counting the number of elements of the co-occurrent word set of the i-th Japanese word is initialized to "0", and second index k which points an element of the Japanese word table 262 is initialized to "1" (step 1642).

The value of element (i,k) of the Japanese co-occurrence frequency matrix 264 is added to A (step 1643). If k is less than the number of Japanese words (step 1644), it is incremented by one (step 1645), and the sequence returns to step 1643. At the time when the index k has reached the number of Japanese words, the value of A indicates the number of elements of the co-occurrent word set of the i-th Japanese word.

Index J which points an element of the English word table 263 is initialized to "1" (step 1646). The following process is repeated, while incrementing the index j by one (step 1654), until it reaches the number of English words (step 1653).

Both variable B for counting the number of elements of the co-occurrent word set of the J-th English word and variable C for counting the number of elements of the intersection of the co-occurrent word set of the i-th Japanese word and the co-occurrent word set of the J-th English word are initialized to "0", and second index k which points an element of the English word table 263 is initialized to "1" (step 1647).

The value of element (j,k) of the English co-occurrence frequency matrix 265 is added to B (step 1648), and the minimum of the element (i,k) of the Japanese-English virtual co-occurrence frequency matrix 268 and the element (j,k) of the English co-occurrence frequency matrix 265 is added to C (step 1649). If k is less than the number of English words (step 1650), it is incremented by one (step 1651), and the sequence returns to step 1648. At the time when index k has reached the number of English words, the value of B indicates the number of elements of the co-occurrent word set of the j-th English word and the value of C indicates the number of elements of the intersection of the co-occurrent word set of the i-th Japanese word and the co-occurrent word set of the j-th English word.

$C/(A+B-C)$ is calculated and the result is delivered as the value of element (i,j) of the Japanese-English word correlation matrix 266 (step 1652).

(7) Selection of candidate translation pairs of words (step 17)

This step extracts candidate translation pairs of words 269 based on the Japanese-English word correlation matrix 266, the Japanese-English translation matrix 267, the Japanese word table 262, and the English word table 263. A candidate translation pair of words 269 is a triplet of a Japanese word 2691, an English word 2692 and the correlation 2693 between them as shown in FIG. 11. Specifically, the step selects from the Japanese-English word correlation matrix 266 an element whose value is the maximum in a row and at the same time the maximum in a column. Then it selects from the Japanese word table 262 the Japanese word that corresponds to the selected element, and from the English word table 263 the English word that corresponds to the selected element. Thus, a pair of a Japanese word and an English word having a mutually maximum correlation is selected as a candidate.

Exceptionally, the candidate is rejected, if another pair of words which is incompatible with the candidate is included in the bilingual dictionary 23 and it has a rather high correlation. "A pair of words incompatible with the candidate" signifies that it shares either a Japanese word or an English word with the candidate. An incompatible pair which is included in the bilingual dictionary 23 can be easily extracted, if there are any, by referring to the Japanese-English translation matrix 267. The correlation between a pair of words that is included in the bilingual dictionary 23 can be evaluated as follows.

In this embodiment, a second correlation measure, which we call "direct correlation", is introduced for this purpose, although the co-occurrence based correlation described before is of course available. Direct correlation Cor2(JW, EW) between Japanese word JW and English word EW is defined as follows:

Cor2(JW,EW)=min{#JW, #EW}/max{#JW, #EW}, where #JW and #EW are the occurrence frequency of JW in the Japanese text 24 and the occurrence frequency of EW in the English text 25, respectively.

The direct correlation Cor2(JW,EW) is very simple, but it is reliable when the bilingual dictionary 23 assures that JW and EW is a possible translation pair. If the occurrence frequency of JW in the Japanese text 24 is close to that of EW in the English text 25, we can conclude that JW in the Japanese text 24 probably corresponds to EW in the English text 25.

Figure 4B:
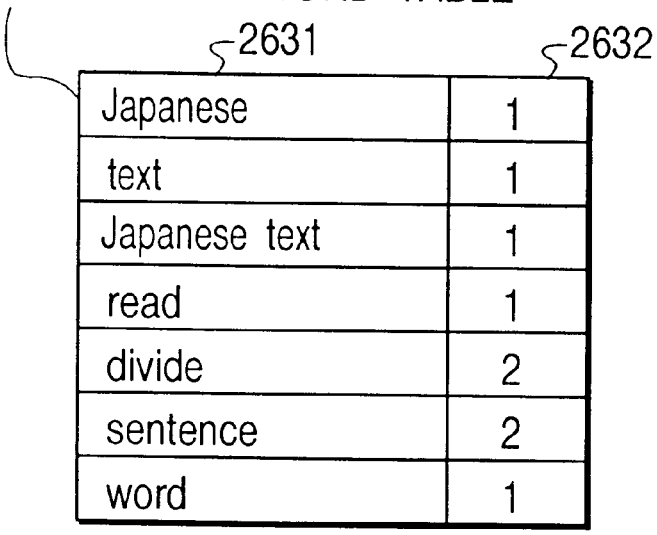
FIG. 4B is a diagram showing an example of English word table.

FIG. 11 shows an example of candidate translation pairs of words, which is derived from the Japanese-English word correlation matrix 266 of FIG. 7, the Japanese-English translation matrix 267 of FIG. 8, the Japanese word table 262 of FIG. 4A and the English word table 263 of FIG. 4B. For instance, in the Japanese-English word correlation matrix 266 of FIG. 7, the correlation between Japanese word "Nihongo-Tekisuto" and English word "Japanese text" is the highest among the correlations of Japanese word "Nihongo-Tekisuto" with the English words. At the same time, it is the highest among the correlations of English word "Japanese text" with the Japanese words. Accordingly, the pair of "Nihongo-Tekisuto" and "Japanese text" is selected as a candidate translation pair of words. Likewise, the pair of Japanese word "Bunkatsusuru" and English word "divide" is selected as another candidate translation pair of words. While Japanese word "Tekisuto" has the highest correlation "⅔" with "Japanese text" among the English words, the English word "Japanese text" has the highest correlation "½" with "Nihongo-Tekisuto" among the Japanese words. Therefore, the pair of the Japanese word "Tekisuto" and the English word "Japanese text" is not selected as a candidate translation pair of words.

FIG. 12 and FIG. 13 show different parts of the routine for carrying out the step 17. Initially, index i which points an element of the Japanese word table 262 is initialized to "1" (step 1701). The following process is repeated, while incrementing the index i by one (step 1727), until it reaches the number of Japanese words (step 1726). Index j which points an element of the English word table 263 is initialized to "1", and variable P for holding the maximum value of correlations pertinent to the i-th word in the Japanese word table 262 (will be termed simply "i-th Japanese word") is initialized to "−1" (step 1702).

The correlation between the i-th Japanese word and the J-th English word (i.e. j-th word in the English word table 263) is compared with the variable P (step 1703). If the correlation is larger than P, the variable P is updated to the value of the correlation, the value of index j is saved in index jm, and register N for holding the number of English words having a correlation equal to P with the i-th Japanese word is set to "1" (step 1704). In step 1703, if the correlation between the i-th Japanese word and the j-th English word is equal to the variable P, the register N is incremented by one (step 1705). If index j is less than the number of English words (1706), j is incremented by one to deal with the next English word (step 1707), and the sequence returns to step 1703.

On completion of the above process for all words in the English word table 263, it is tested as to whether the variable N, which indicates the number of English words having the maximum correlation P with the i-th Japanese word, is "1" (step 1708). Unless N is equal to "1", indicative of the failure of extraction of translation word for the i-th Japanese word, the sequence goes to step 1726. If N is equal to "1", the correlation of each Japanese words with the jm-th English word is compared with the variable P (step 1709–step 1712).

Specifically, second index k which points an element of the Japanese word table 262 is initialized to "1" (step 1709), and the correlation between the k-th Japanese word and the jm-th English word is compared with variable P (step 1710), while incrementing index k by one (step 1712) until it reaches the number of Japanese words (step 1711). If there is a Japanese word having a correlation larger than P with the jm-th English word, it is determined that the i-th Japanese word and jm-th English word do not form a translation pair of words and the sequence goes to step 1726. If there is no Japanese word having a correlation larger than P with the jm-th English word, the pair of the i-th Japanese word and the jm-th English word is left as a candidate translation pair of words because it has proved to have a mutually maximum correlation.

Subsequently, the variable P, i.e. the correlation between the i-th Japanese word and jm-th English word, is compared with the direct correlations pertinent to the i-th Japanese word (step 1713–step 1718). Initially, index j which points an element of the English word table 263 is initialized to "1" (step 1713). The direct correlation Q between the i-th Japanese word and j-th English word is compared with the variable P, while incrementing the index J by one (step 1718) until it reaches the number of English words (step 1717). The comparison process is skipped unless the element (i,j) of the Japanese-English translation matrix 267 is "1" (step 1714). The direct correlation Q is calculated by dividing the minimum of the occurrence frequencies (2622, 2632) of the i-th Japanese word and the j-th English word by the maximum of these frequencies (step 1715). Then the values of P and Q are compared (step 1716). If there is an English word with which the i-th Japanese word has a direct correlation Q larger than P, the pair of i-th Japanese word and jm-th English word is disqualified for a candidate translation pair of words, and the sequence goes to step 1726.

Similarly, the variable P, i.e. the correlation between the i-th Japanese word and jm-th English word, is compared with the direct correlations pertinent to the jm-th English word (step 1719–step 1724). Initially, index k which points an element of the Japanese word table 262 is initialized to "1" (step 1719). The direct correlation Q between the k-th Japanese word and jm-th English word is compared with the variable P, while incrementing the index k by one (step 1724) until it reaches the number of Japanese words (step 1723). The comparison process is skipped unless the element (k,jm) of the Japanese-English translation matrix 267 is "1" (step 1720). The direct correlation Q is calculated by dividing the minimum of the occurrence frequencies (2622, 2632) of the k-th Japanese word and the jm-th English word by the maximum of these frequencies (step 1721). Then the values of P and Q are compared (step 1722). If there is a Japanese word with which the jm-th English word has a direct correlation Q larger than P, the pair of i-th Japanese word and jm-th English word is disqualified for a candidate translation pair of words, and the sequence goes to step 1726.

If there is neither an English word with which the i-th Japanese word has a direct correlation Q larger than P nor a Japanese word with which the jm-th English word has a direct correlation Q larger than P, a triplet of the i-th Japanese word, the jm-th English word and the value of the variable P is delivered as a candidate translation pair of words 269 (step 1725).

(8) Display of candidate translation pairs of words and registration of user selected pairs (step 18)

This step displays on the display device 4 the candidate translation pairs of words 269 extracted through the preceding steps. The user determines whether each of the candidates to be registered in the bilingual dictionary. The program 20 operates to register user selected pairs of a Japanese word 2691 and an English word 2692 in the bilingual dictionary 23.

The embodiment above enables automatic extraction of translation pairs of words from a bilingual text. For example, two translation pairs of Japanese and English words shown in FIG. 11 can be extracted from the bilingual text comprised of Japanese and English texts shown in FIGS. 3A and 3C, by use of the bilingual dictionary which originally includes three translation pairs of words as shown in FIG. 6. The extracted translation pairs of words are registered into the bilingual dictionary. Thus, the bilingual dictionary can be augmented incrementally.

Modifications:

The present invention is not limited to the above-described embodiment, but covers various modifications including those shown below and others.

(1) In the embodiment above, "co-occurrence in sentence" is adopted as definition of co-occurrence. That is, a pair of words are regarded as co-occurring with each other, when they occur in the same sentence. However, there are several alternatives including "co-occurrence in k-words window" and "syntactic co-occurrence". According to co-occurrence in k-words window, a pair of words are regarded as co-occurring with each other, when they occur less than k words apart in a text. According to syntactic co-occurrence, a pair of words are regarded as co-occurring with each other, when they are syntactically related in a sentence. It is obvious that the present invention is compatible with these definitions of co-occurrence.

(2) In the embodiment above, pairs of a compound word and its constituent words are excluded from co-occurrence data. However, correspondence between a pair of compound words is supported by correspondences between their constituent words. Therefore, each constituent word of a compound word may be counted as a word co-occurring with the compound word. This strategy will give us a more reliable correlation measure which reflects not only contextual information but also compositional information of words.

(3) The correlation between a pair of words may be defined differently from that used in the embodiment above. For example, a context characterizing a word may be represented by a co-occurrent word vector whose i-th component indicates the frequency of co-occurring with the i-th word, and the correlation between a pair of words may be defined as the inner product of the two vectors. The inner product of a Japanese word vector and an English word vector, whose components correspond to words of respective language, is calculated with the assistance of a bilingual dictionary.

(4) In the embodiment above, candidate translation pairs of words are selected based on mutually-maximum-correlation criterion. There are several alternative criteria. According to threshold criterion, pairs of words having a correlation larger than or equal to a predetermined threshold value are selected.

(5) The embodiment above includes a substep of rejecting some of the pairs having a mutually maximum correlation. That is, a candidate is rejected if it is incompatible with another pair of words having a rather high direct correlation. This substep may be refined by giving appropriate weight to the direct correlation. Alternatively, this substep can be completely skipped.

(6) In step 18, displaying the candidate translation pairs of words can be skipped so that all the candidate translation pairs extracted through the preceding steps be immediately registered in the bilingual dictionary.

As is clear from the embodiment above, according to the present invention, translation pairs of words can be extracted from a bilingual pair of texts automatically. This method is able to extract various types of translation pairs of words including pairs of simple words, pairs of compound words, and pairs of a simple word and a compound word. Furthermore, it is able to extract translation pairs from a bilingual pair of texts which are not aligned sentence by sentence. It reduces the cost of augmenting bilingual dictionaries for machine translation, cross-language information retrieval, and the like.

What is claimed is:

1. A method for automatic extraction of a translation pair of words which comprises a word of a first language and a word of a second language corresponding thereto, comprising steps executed by a computer, the steps including:

extracting a plurality of words of the first language occurring in a first text described in the first language, from first text data which represents said first text;

extracting, in correspondence to each occurrent word of the first language, a set of a plurality of co-occurrent words of the first language for said each occurrent word of the first language, each co-occurrent word of the first language being a word which occurs in a neighborhood of at least one of a plurality of positions within said first text where said each occurrent word of the first language occurs, and which fulfills at the same time a first predetermined condition related to said each occurrent word of the first language, said extracting being done from said first text data;

extracting a plurality of words of the second language occurring in a second text corresponding to the first text and described in the second language, from second text data which represents said second text;

extracting, in correspondence to each occurrent word of the second language, a set of a plurality of co-occurrent words of the second language for said each occurrent word of the second language, each co-occurrent word of the second language being a word which occurs in a neighborhood of at least one of a plurality of positions within said second text where said each occurrent word of the second language occurs, and which fulfills at the same time a second predetermined condition related to said each occurrent word of the second language, said extracting being done from said second text data;

calculating a correlation between each occurrent word of the first language and each occurrent word of the second language, said calculating being done based on said set of a plurality of co-occurrent words of the first language extracted in correspondence to said each occurrent word of the first language and said set of a plurality of co-occurrent words of the second language extracted in correspondence to said each occurrent word of the second language; and selecting, as a translation pair of words, at least one pair of words from a plurality of pairs of words, each pair of words comprising one of said plurality of occurrent words of the first language and one of said plurality of occurrent words of the second language, said at least one pair of words being a pair of words between which a correlation satisfies a predetermined condition related to a translation pair of words, said selecting being done based upon a plurality of pairs of words.

2. A method for automatic extraction of a translation pair of words according to claim 1, wherein said first predetermined condition related to each occurrent word of the first language is that said each co-occurrent word of the first language occurs in at least one of a plurality of sentences in the first text where said each occurrent word of the first language occurs;

wherein said second predetermined condition related to each occurrent word of the second language is that said each co-occurrent word of the second language occurs in at least one of a plurality of sentences in the second text where said each occurrent word of the second language occurs.

3. A method for automatic extraction of a translation pair of words according to claim 1, wherein said first predetermined condition related to each occurrent word of the first language is that said each co-occurrent word of the first language occurs within a predetermined distance from one of a plurality of positions where said each occurrent word of the first language occurs;

wherein said second predetermined condition related to each occurrent word of the second language is that said each co-occurrent word of the second language occurs within a predetermined distance from one of a plurality of positions where said each occurrent word of the second language occurs.

4. A method for automatic extraction of a translation pair of words according to claim 1, wherein said step of extracting said plurality of occurrent words of the first language includes a step of extracting compound words occurring in the first text, if there is any, in addition to simple words occurring in the first text;

wherein said step of extracting said plurality of occurrent words of the second language includes a step of extracting compound words occurring in the second text, if there is any, in addition to simple words occurring in the second text.

5. A method for automatic extraction of a translation pair of words according to claim 1, further comprising the steps of:

calculating co-occurrence frequency of each of said set of a plurality of co-occurrent words of the first language extracted in correspondence to each occurrent word of the first language; and calculating co-occurrence frequency of each of said set of a plurality of co-occurrent words of the second language extracted in correspondence to each occurrent word of the second language;

wherein said calculating step includes a step of calculating a correlation between each occurrent word of the first language and each occurrent word of the second language, based upon co-occurrence frequencies of said set of co-occurrent words of the first language extracted in correspondence to said each occurrent word of the first language and co-occurrence frequencies of said set of co-occurrent words of the second language extracted in correspondence to said each occurrent word of the second language.

6. A method for automatic extraction of a translation pair of words according to claim 1, wherein said calculating step includes a step of calculating a correlation between each occurrent word of the first language and each occurrent word of the second language, based upon a total number of pairs of words coincident to predetermined translation pairs of words, among total word pairs each word pair being one formed by a word included in said set of co-occurrent words of the first language extracted in correspondence to said each occurrent word of the first language and a word included in said set of co-occurrent words of the second language extracted in correspondence to said each occurrent word of the second language.

7. A method for automatic extraction of a translation pair of words according to claim 1, wherein said predetermined condition related to a translation pair of words is that a correlation between a pair of one of said plurality of occurrent words of the first language and one of said plurality of occurrent words of the second language, said pair being one to be selected as a translation pair of words, is largest among correlations respectively between said one of said plurality of occurrent words of the first language and ones of said plurality of occurrent words of the second language, and at the same time largest among correlations respectively between ones of said plurality of occurrent words of the first language and said one of said plurality of occurrent words of the second language.

8. A method for automatic extraction of a translation pair of words according to claim 1, wherein said predetermined condition related to a translation pair of words is that a correlation between a pair of one of said plurality of occurrent words of the first language and one of said plurality of occurrent words of the second language, said pair being one to be selected as a translation pair of words, is larger than or equal to a predetermined threshold.

9. A method for automatic extraction of a translation pair of words according to claim 1, further comprising the steps of:

calculating co-occurrence frequency of each of said set of a plurality of co-occurrent words of the first language extracted in correspondence to each occurrent word of the first language; and calculating co-occurrence frequency of each of said set of a plurality of co-occurrent words of the second language extracted in correspondence to each occurrent word of the second language;

wherein said calculating step comprises a step of calculating a correlation between each occurrent word of the first language and each occurrent word of the second language, based upon occurrence frequencies of pairs of words coincident to predetermined translation pairs of words, among total word pairs, each word pair comprising a word included in said set of co-occurrent words of the first language extracted in correspondence to said each occurrent word of the first language and a word included in said set of co-occurrent words of the second language extracted in correspondence to said each occurrent word of the second language.

10. A method for automatic extraction of a translation pair of words according to claim 9, wherein said predetermined condition related to a translation pair of words is that a correlation between a pair of one of said plurality of occurrent words of the first language and one of said plurality of occurrent words of the second language, said pair being one to be selected as a translation pair of words, is largest among correlations respectively between said one of said plurality of occurrent words of the first language and ones of said plurality of occurrent words of the second language, and at the same time largest among correlations respectively between ones of said plurality of occurrent words of the first language and said one of said plurality of occurrent words of the second language.

11. A method for automatic extraction of a translation pair of words according to claim 9, wherein said predetermined condition related to a translation pair of words is that a correlation between a pair of one of said plurality of occurrent words of the first language and one of said plurality of occurrent words of the second language, said pair being one to be selected as a translation pair of words, is larger than or equal to a predetermined threshold.

12. A method for automatic extraction of a translation pair of words according to claim 9,
wherein said predetermined translation pairs of words are ones already stored in a bilingual dictionary;
wherein said method further comprises a step of adding said selected at least one pair of words to said bilingual dictionary.

13. A method for automatic extraction of a translation pair of words according to claim 12, further comprising the steps of:
displaying said selected at least one pair of words on a display device; and
executing said adding step, in response to an instruction by an operator.

14. A machine readable program storage device storing a program programmed so as to execute all of said steps of claim 1.

15. A machine readable program storage device according to claim 14,
wherein said first predetermined condition related to each occurrent word of the first language is that said each co-occurrent word of the first language occurs in at least one of a plurality of sentences in the first text where said each occurrent word of the first language occurs;
wherein said second predetermined condition related to each occurrent word of the second language is that said each co-occurrent word of the second language occurs in at least one of a plurality of sentences in the second text where said each occurrent word of the second language occurs.

16. A machine readable program storage device according to claim 14,
wherein said first predetermined condition related to each occurrent word of the first language is that said each co-occurrent word of the first language occurs within a predetermined distance from one of a plurality of positions where said each occurrent word of the first language occurs;
wherein said second predetermined condition related to each occurrent word of the second language is that said each co-occurrent word of the second language occurs within a predetermined distance from one of a plurality of positions where said each occurrent word of the second language occurs.

17. A machine readable program storage device according to claim 14,
wherein said step of extracting said plurality of occurrent words of the first language includes a step of extracting compound words occurring in the first text, if there is any, in addition to simple words occurring in the first text;
wherein said step of extracting said plurality of occurrent words of the second language includes a step of extracting compound words occurring in the second text, if there is any, in addition to simple words occurring in the second text.

18. A machine readable program storage device according to claim 14, wherein said program is programmed so as to further execute the steps of:
calculating co-occurrence frequency of each of said set of a plurality of co-occurrent words of the first language extracted in correspondence to each occurrent word of the first language; and
calculating co-occurrence frequency of each of said set of a plurality of co-occurrent words of the second language extracted in correspondence to each occurrent word of the second language;
wherein said calculating step includes a step of calculating a correlation between each occurrent word of the first language and each occurrent word of the second language, based upon co-occurrence frequencies of said set of co-occurrent words of the first language extracted in correspondence to said each occurrent word of the first language and co-occurrence frequencies of said set of co-occurrent words of the second language extracted in correspondence to said each occurrent word of the second language.

19. A machine readable program storage device according to claim 14, wherein said calculating step includes a step of calculating a correlation between each occurrent word of the first language and each occurrent word of the second language, based upon a total number of pairs of words coincident to predetermined translation pairs of words, among total word pairs each word pair being one formed by a word included in said set of co-occurrent words of the first language extracted in correspondence to said each occurrent word of the first language and a word included in said set of co-occurrent words of the second language extracted in correspondence to said each occurrent word of the second language.

20. A machine readable program storage device according to claim 14, wherein said predetermined condition related to a translation pair of words is that a correlation between a pair of one of said plurality of occurrent words of the first language and one of said plurality of occurrent words of the second language, said pair being one to be selected as a translation pair of words, is largest among correlations respectively between said one of said plurality of occurrent words of the first language and ones of said plurality of occurrent words of the second language, and at the same time largest among correlations respectively between ones of said plurality of occurrent words of the first language and said one of said plurality of occurrent words of the second language.

21. A machine readable program storage device according to claim 14, wherein said predetermined condition related to a translation pair of words is that a correlation between a pair of one of said plurality of occurrent words of the first language and one of said plurality of occurrent words of the second language, said pair being one to be selected as a translation pair of words, is larger than or equal to a predetermined threshold.

22. A machine readable program storage device according to claim 14, wherein said program is programmed so as to further execute the steps of:

calculating co-occurrence frequency of each of said set of a plurality of co-occurrent words of the first language extracted in correspondence to each occurrent word of the first language; and calculating co-occurrence frequency of each of said set of a plurality of co-occurrent words of the second language extracted in correspondence to each occurrent word of the second language;

wherein said calculating step comprises a step of calculating a correlation between each occurrent word of the first language and each occurrent word of the second language, based upon occurrence frequencies of pairs of words coincident to predetermined translation pairs of words, among total word pairs, each word pair comprising a word included in said set of co-occurrent words of the first language extracted in correspondence to said each occurrent word of the first language and a word included in said set of co-occurrent words of the second language extracted in correspondence to said each occurrent word of the second language.

23. A machine readable program storage device according to claim 22, wherein said predetermined condition related to a translation pair of words is that a correlation between a pair of words is that a correlation between a pair of one of said plurality of occurrent words of the first language and one of said plurality of occurrent words of the second language, said pair being one to be selected as a translation pair of words, is largest among correlations respectively between said one of said plurality of occurrent words of the first language and ones of said plurality of occurrent words of the second language, and at the same time largest among correlations respectively between ones of said plurality of occurrent words of the first language and said one of said plurality of occurrent words of the second language.

24. A machine readable program storage device according to claim 22, wherein said predetermined condition related to a translation pair of words is that a correlation between a pair of one of said plurality of occurrent words of the first language and one of said plurality of occurrent words of the second language, said pair being one to be selected as a translation pair of words, is larger than or equal to a predetermined threshold.

25. A machine readable program storage device according to claim 22, wherein said predetermined translation pairs of words are ones already stored in a bilingual dictionary;

wherein said program is programmed so as to further execute a step of adding said selected at least one pair of words to said bilingual dictionary.

26. A machine readable program storage device according to claim 25, wherein said program is further programmed so as to execute the steps of:

displaying said selected at least one pair of words on a display device; and executing said adding step, in response to an instruction by an operator.

27. A method of producing a bilingual dictionary using automatic extraction of a translation pair of words according to claim 1, further comprising a step of producing a bilingual dictionary which stores a plurality of translation pairs of words, each translation pair being one selected by said selecting step.

28. A method of producing a bilingual dictionary using automatic extraction of a translation pair of words according to claim 27, wherein said first predetermined condition related to each occurrent word of the first language is that said each co-occurrent word of the first language occurs in at least one of a plurality of sentences in the first text where said each occurrent word of the first language occurs;

wherein said second predetermined condition related to each occurrent word of the second language is that said each co-occurrent word of the second language occurs in at least one of a plurality of sentences in the second text where said each occurrent word of the second language occurs.

29. A method of producing a bilingual dictionary using automatic extraction of a translation pair of words according to claim 27, wherein said first predetermined condition related to each occurrent word of the first language is that said each co-occurrent word of the first language occurs within a predetermined distance from one of a plurality of positions where said each occurrent word of the first language occurs;

wherein said second predetermined condition related to each occurrent word of the second language is that said each co-occurrent word of the second language occurs within a predetermined distance from one of a plurality of positions where said each occurrent word of the second language occurs.

30. A method of producing a bilingual dictionary using automatic extraction of a translation pair of words according to claim 27, wherein said step of extracting said plurality of occurrent words of the first language includes a step of extracting compound words occurring in the first text, if there is any, in addition to simple words occurring in the first text;

wherein said step of extracting said plurality of occurrent words of the second language includes a step of extracting compound words occurring in the second text, if there is any, in addition to simple words occurring in the second text.

31. A method of producing a bilingual dictionary using automatic extraction of a translation pair of words according to claim 27, further comprising the steps of:

calculating co-occurrence frequency of each of said set of a plurality of co-occurrent words of the first language extracted in correspondence to each occurrent word of the first language; and calculating co-occurrence frequency of each of said set of a plurality of co-occurrent words of the second language extracted in correspondence to each occurrent word of the second language;

wherein said calculating step includes a step of calculating a correlation between each occurrent word of the first language and each occurrent word of the second language, based upon co-occurrence frequencies of said set of co-occurrent words of the first language extracted in correspondence to said each occurrent word of the first language and co-occurrence frequencies of said set of co-occurrent words of the second language extracted in correspondence to said each occurrent word of the second language.

32. A method of producing a bilingual dictionary using automatic extraction of a translation pair of words according to claim 27, wherein said calculating step includes a step of calculating a correlation between each occurrent word of the first language and each occurrent word of the second language, based upon a total number of pairs of words coincident to predetermined translation pairs of words, among total word pairs each word pair being one formed by a word included in said set of co-occurrent words of the first language extracted in correspondence to said each occurrent word of the first language and a word included in said set of co-occurrent words of the second language extracted in correspondence to said each occurrent word of the second language.

33. A method of producing a bilingual dictionary using automatic extraction of a translation pair of words according to claim 27, wherein said predetermined condition related to a translation pair of words is that a correlation between a pair of one of said plurality of occurrent words of the first language and one of said plurality of occurrent words of the second language, said pair being one to be selected as a translation pair of words, is largest among correlations respectively between said one of said plurality of occurrent words of the first language and ones of said plurality of occurrent words of the second language, and at the same time largest among correlations respectively between ones of said plurality of occurrent words of the first language and said one of said plurality of occurrent words of the second language.

34. A method of producing a bilingual dictionary using automatic extraction of a translation pair of words according to claim 27, wherein said predetermined condition related to a translation pair of words is that a correlation between a pair of one of said plurality of occurrent words of the first language and one of said plurality of occurrent words of the second language, said pair being one to be selected as a translation pair of words, is larger than or equal to a predetermined threshold.

35. A method of producing a bilingual dictionary using automatic extraction of a translation pair of words according to claim 27, further comprising the steps of:

calculating co-occurrence frequency of each of said set of a plurality of co-occurrent words of the first language extracted in correspondence to each occurrent word of the first language; and calculating co-occurrence frequency of each of said set of a plurality of co-occurrent words of the second language extracted in correspondence to each occurrent word of the second language;

wherein said calculating step comprises a step of calculating a correlation between each occurrent word of the first language and each occurrent word of the second language, based upon occurrence frequencies of pairs of words coincident to predetermined translation pairs of words, among total word pairs, each word pair comprising a word included in said set of co-occurrent words of the first language extracted in correspondence to said each occurrent word of the first language and a word included in said set of co-occurrent words of the second language extracted in correspondence to said each occurrent word of the second language.

36. A method of producing a bilingual dictionary using automatic extraction of a translation pair of words according to claim 35, wherein said predetermined condition related to a translation pair of words is that a correlation between a pair of one of said plurality of occurrent words of the first language and one of said plurality of occurrent words of the second language, said pair being one to be selected as a translation pair of words, is largest among correlations respectively between said one of said plurality of occurrent words of the first language and ones of said plurality of occurrent words of the second language, and at the same time largest among correlations respectively between ones of said plurality of occurrent words of the first language and said one of said plurality of occurrent words of the second language.

37. A method of producing a bilingual dictionary using automatic extraction of a translation pair of words according to claim 35, wherein said predetermined condition related to a translation pair of words is that a correlation between a pair of one of said plurality of occurrent words of the first language and one of said plurality of occurrent words of the second language, said pair being one to be selected as a translation pair of words, is larger than or equal to a predetermined threshold.

38. A method of producing a bilingual dictionary using automatic extraction of a translation pair of words according to claim 35, wherein said predetermined translation pairs of words are ones already stored in said bilingual dictionary;

wherein said method further comprises a step of adding said selected at least one pair of words to said bilingual dictionary.

39. A method of producing a bilingual dictionary using automatic extraction of a translation pair of words according to claim 38, further comprising the steps of:

displaying said selected at least one pair of words on a display device; and executing said adding step, in response to an instruction by an operator.

* * * * *